United States Patent Office 2,966,500
Patented Dec. 27, 1960

---

2,966,500

NOVEL PROCESS FOR THE PRODUCTION OF ANDROSTERONE AND THE RESULTING NOVEL INTERMEDIATE

Robert Joly, Montmorency, Julien Warnant, Neuilly, and Jacques Prost-Marechal, Paris, France, assignors to Les Laboratoires Francais de Chimiotherapie, Paris, France, a corporation of France No Drawing. Filed June 14, 1960, Ser. No. 35,894

Claims priority, application France June 15, 1959

7 Claims. (Cl. 260—397.4)

The invention relates to a novel process for the production of androsterone. It also relates to a novel intermediate resulting therefrom, namely, epiandrosterone methane sulfonate.

There has been a growing interest in androsterone since the property of this product to lower the amount of cholesterol in the body has been brought to light (see Chemical and Engineering News, May 25, 1959, page 48). It was important to find a simple and effective means for producing this substance starting with epiandrosterone which would avoid the laborious processes of epimerization used up to now, which gave low yields and required several chromatographic separations among other disadvantages.

The epimerization of epiandrosterone has been previously achieved through its p-toluene sulfonate intermediate which is subject to acetolysis by heating in acetic acid or in a mixture of acetic acid and acetic acid anhydride (see J. Org. Chem. 1955, vol. 20, page 542; Chem. Listy 1953, vol. 47, page 1207) to give androsterone.

An object of the invention is to produce androsterone by a novel sequence of steps.

A further object is to produce androsterone which avoids the long and complicated steps of chromatography and digitonin previously employed in epimerization by means of the toluene sulfonate intermediate.

Another object of the invention is the novel intermediate, epiandrosterone methane sulfonate.

These and other objects and advantages of this invention will become more obvious from the following detailed description.

We have now found, totally unexpectedly, that the epiandrosterone methane sulfonate lends itself much better to the acetolysis transformation. Acetolysis furnishes, in this case, a very superior yield, on heating in dimethylformamide and in the presence of an alkalimetal acetate. A separation of the reaction mixture by chromatography, by treatment with digitonin, etc. is then not necessary.

The process of the invention, the simplicity of which is remarkable, consists essentially of preparing the epiandrosterone methane sulfonate, heating the latter in dimethylformamide in the presence of an alkali metal acetate, which transforms it into androsterone acetate, which, without intermediate purification, is hydrolyzed into androsterone. According to a preferred mode of operation of the process of the invention, epiandrosterone is dissolved in an appropriate organic base, a methane sulfonyl halide is added thereto, the reaction mixture is poured in acidified water. The epiandrosterone methane sulfonate, formed thereby, is isolated, and is refluxed with dimethylformamide in the presence of an alkali metal acetate. The solution is poured into ice water, the mixture is vacuum filtered and treated with lower alkanolic alkali metal hydroxide. Then according to known processes, the raw androsterone is isolated, and recrystallized in an appropriate solvent. The reaction scheme is set forth on Table I.

Table I

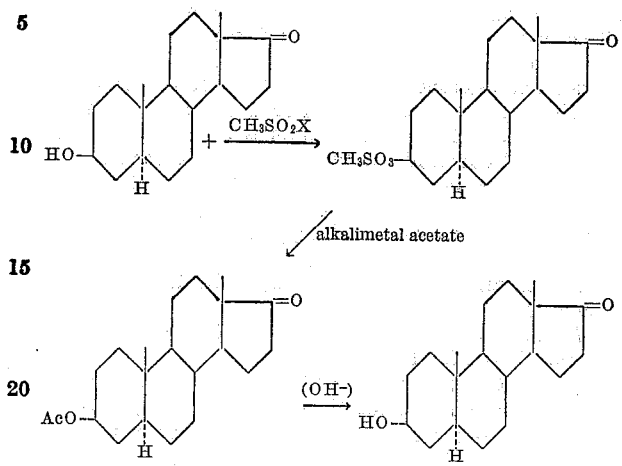

Advantageously, the epiandrosterone is treated at a temperature around 20° C. with methane sulfonyl chloride in pyridine; the epiandrosterone methane sulfonate is treated, in turn, by refluxing with dimethylformamide in the presence of potassium acetate at a temperature near the boiling boint of dimethylformamide; the methanolysis is effected by refluxing with methanolic potassium hydroxide and the recrystallization solvent of androsterone is a lower alkanoic acid ester such as ethyl acetate.

In the following examples there are described several preferred embodiments to illustrate the invention. However, it should be understood that the invention is not intended to be limited to the specific embodiments. The melting points are instantaneous melting points which have been determined on a Maquenne block.

EXAMPLE 1

*Production of epiandrosterone methane sulfonate*

30 gm. of epiandrosterone are dissolved in 60 cc. of pyridine. While stirring at 20° C., 12.6 cc. of methane sulfonyl chloride are added thereto and the stirring is continued for seventeen hours at 20° C. while protected from light.

The mixture is poured into 600 cc. of a mixture of water and ice (1:1) and 75 cc. of 22° Bé. hydrochloric acid. The mixture is agitated for two hours, vacuum filtered, washed with 1 N hydrochloric acid and with water and dried at 60° C. Thus, 38 gm. (quantitative yield) of epiandrosterone methane sulfonate are obtained. The melting point is 155° C., specific rotation $[\alpha]_D^{20} = +67° \pm 2$ (c.=1%, ethanol). The product, which has not yet been described, is obtained in the form of small colorless crystals, insoluble in water, ether, slightly soluble in cold alcohol, and very soluble in chloroform.

*Analysis.*—$C_{20}H_{32}O_4S$; molecular weight=368.53. Calculated: C, 65.17%; H, 8.75%; S, 8.70%; O, 17.39%. Found: C, 65.3%; H, 8.8%; S, 8.5%; O, 17.1%.

EXAMPLE 2

*Production of androsterone*

156.8 gm. of potassium acetate, 15.5 cc. of water and 31 gm. of epiandrosterone methane sulfonate, obtained according to the preceding example, are introduced into 155 cc. of dimethylformamide. The mixture is refluxed under agitation and in an atmosphere of nitrogen for 18 hours. It is cooled slightly and poured, while agitating well, into 1550 cc. of a mixture of water and ice (1:1), agitated again for 30 minutes at 0° C. and then vacuum filtered. The filter cake is washed with water and introduced without drying into 155 cc. of methanol containing 8.3 gm. of potassium hydroxide. It is refluxed under an atmosphere of nitrogen for one hour, cooled, acidified to a pH of 6 with acetic acid. 1.5 gm. of charcoal are added thereto and left in contact with the solution of several minutes, and then filtered. The filtrate is evaporated to dryness and the residue is triturated in 93 cc. water. It is vacuum filtered, washed with water and dried at 80° C., to obtain 23.7 gm. (97% of theory) of raw androsterone. The product is put into solution by refluxing in 142 cc. of ethyl acetate and 0.25 gm. of charcoal are added. The solution is filtered while hot, then cooled and iced for two hours. It is vacuum filtered, and the filter cake is washed with iced ethyl acetate and dried to 80° C. to obtain 16.7 gm. (68.5% of theory) of androsterone, melting point=186° C., specific rotation $[\alpha]_D^{20} = +96° \pm 2$ (c.=1%, ethanol). The product is perfectly identical to an authentic sample of androsterone.

*Microanalysis.*—Calculated: C, 78.56%; H, 10.41%. Found: C, 78.7%; H, 10.1%.

The preceding examples are not limitative of the invention. Various modifications of the process, such as varying the order of introduction of the reagents, the temperatures and duration of the reaction or the use of equivalent techniques, may be made without departing from the spirit or scope of the invention. It is to be understool that the invention be limited only as defined in the appended claims.

We claim:
1. The methane sulfonate of epiandrosterone.
2. A process for the production of androsterone which comprises reacting epiandrosterone with a methane sulfonyl halide to form epiandrosterone methane sulfonate, heating the latter in dimethylformamide in the presence of an alkali metal acetate to produce androsterone acetate and hydrolyzing said acetate to form androsterone.
3. A process for the production of androsterone which comprises dissolving epiandrosterone in an organic base, adding a methane sulfonyl halide thereto, pouring the resultant mixture in acidified water, isolating the epiandrosterone methane sulfonate formed thereby, refluxing the latter with dimethylformamide in the presence of an alkali metal acetate, pouring the solution into ice water, vacuum filtering, treating the filter cake with lower alkanolic alkali metal hydroxide, isolating androsterone and recrystallizing androsterone from a solvent.
4. The process of claim 3 in which the epiandrosterone is treated with methane sulfonyl chloride in pyridine at a temperature of about 20° C.
5. The process of claim 3 in which epiandrosterone methane sulfonate is refluxed with dimethylformamide in the presence of potassium acetate at a temperature near the boiling point of dimethylformamide.
6. The process of claim 3 in which the lower alkanolic alkali metal hydroxide is methanolic potassium hydroxide.
7. The process of claim 3 in which the recrystallization solvent is ethyl acetate.

No references cited.